(12) United States Patent
Funk et al.

(10) Patent No.: US 11,498,532 B2
(45) Date of Patent: Nov. 15, 2022

(54) PARKING BRAKE SYSTEM FOR STAND-ON TERRAIN WORKING VEHICLE

(71) Applicant: Excel Industries, Inc., Hesston, KS (US)

(72) Inventors: Brian R. Funk, Hesston, KS (US); Robert C. Esau, Hesston, KS (US); Brian L. Nebel, Hesston, KS (US)

(73) Assignee: EXCEL INDUSTRIES, INC., Hesston, KS (US)

(*) Notice: Subject to any disclaimer, the term of this patent is extended or adjusted under 35 U.S.C. 154(b) by 399 days.

(21) Appl. No.: 16/842,201

(22) Filed: Apr. 7, 2020

(65) Prior Publication Data

US 2021/0309189 A1    Oct. 7, 2021

(51) Int. Cl.
  *B60T 7/06*   (2006.01)
  *B60T 7/04*   (2006.01)
  *F16H 21/50*  (2006.01)
  *B60T 17/22*  (2006.01)
  *A01D 69/10*  (2006.01)

(52) U.S. Cl.
  CPC ......... *B60T 7/06* (2013.01); *A01D 69/10* (2013.01); *B60T 7/045* (2013.01); *B60T 17/223* (2013.01); *F16H 21/50* (2013.01)

(58) Field of Classification Search
  CPC .......... B60T 7/06; B60T 7/045; B60T 17/223; A01D 69/10; B62D 51/02
  See application file for complete search history.

(56) References Cited

U.S. PATENT DOCUMENTS

| 3,608,285 | A | * | 9/1971 | Berk | A01D 34/64 56/10.2 R |
| 4,061,053 | A | * | 12/1977 | Keene | G05G 1/46 74/512 |
| 4,248,331 | A | * | 2/1981 | Behrens | B60W 10/18 192/17 R |
| 5,809,755 | A | * | 9/1998 | Velke | B62D 11/183 56/14.7 |
| 5,984,031 | A | * | 11/1999 | Velke | B62D 51/04 56/14.7 |
| 6,199,354 | B1 | * | 3/2001 | King | A01D 34/6812 56/11.4 |

\* cited by examiner

*Primary Examiner* — Thomas C Diaz
(74) *Attorney, Agent, or Firm* — Shook, Hardy & Bacon, L.L.P.

(57) ABSTRACT

Aspects hereof relate to a stand-on terrain working vehicle having a foot-operated parking brake system. The parking brake system includes a pedal assembly having a first pedal and a second pedal, an actuator coupled to the pedal assembly, a brake configured to be actuated between a set/engaged state and a released/disengaged state, and an over-center linkage. When the first pedal of the pedal assembly is depressed, the brake is actuated to the set/engaged state, and when the second pedal of the pedal assembly is depressed, the brake is actuated to the released/disengaged state. The over-center linkage is configured to bias the brake towards one of the set/engaged state and the released/disengaged state.

20 Claims, 9 Drawing Sheets

PARKING BRAKE SYSTEM FOR STAND-ON TERRAIN WORKING VEHICLE

FIELD

Aspects provided relate to a parking brake system for a stand-on terrain working vehicle.

BACKGROUND

At a basic level, a stand-on terrain working vehicle (e.g., a mower) includes a frame carried on a plurality of wheels. Coupled to the frame are a plurality of systems, including, for example, a propulsion system (e.g., a hydrostatic motor), a power generation system (e.g., a gasoline engine), a terrain working system (e.g., a cutting deck), and a parking brake system, among other systems, apparatuses, assemblies, and devices. Historically, the parking brake system of a stand-on terrain working vehicle has been hand-operated. For example, a control lever would extend proximate to a control tower of the vehicle and would be mechanically connected to the parking brake system. To set the parking brake system on these previous stand-on terrain working vehicles the operator would adjust the control lever between an engaged and disengaged position. These control levers and/or the connected mechanical linkages had to extend several feet above the previous parking brake systems in order to be within reach of an operator in a standing position. As a result, significant amounts of materials and/or parts were required.

SUMMARY

At a high level, a stand-on terrain working vehicle may comprise a frame, an operator platform for the operator to stand on, a propulsion system, and a parking brake system. In some aspects, the parking brake system may comprise a brake, a pedal assembly, and an over-center linkage. The parking brake system may be positioned proximate the operator platform enabling the operator to set the brake with his or her foot via the pedal assembly. Thus, the operator may quickly and easily engage the parking brake system. As a result of the parking brake system being foot-operated, fewer parts and/or materials are required in comparison to prior art parking brake systems.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other present or future technologies. Further, it should be appreciated that the figures do not necessarily represent an all-inclusive representation of the embodiments herein and may have various components hidden to aid in the written description thereof.

At a high level, a stand-on terrain working vehicle may comprise a frame, an operator platform for the operator to stand on, a propulsion system, and a parking brake system. In some aspects, the parking brake system may comprise a brake, a pedal assembly, and an over-center linkage. The parking brake system may be positioned proximate the operator platform enabling the operator to set the brake with his or her foot via the pedal assembly. Thus, the operator may quickly and easily engage the parking brake system. As a result of the parking brake system being foot-operated, fewer parts and materials are required in comparison to prior art parking brake systems.

In the figures that follow, the terrain working vehicle is illustrated as a stand-on, zero-turn mower. However, the illustrated embodiment is merely one aspect of the present invention, which may be employed on numerous other types of stand-on terrain working vehicles.

Figure 1:
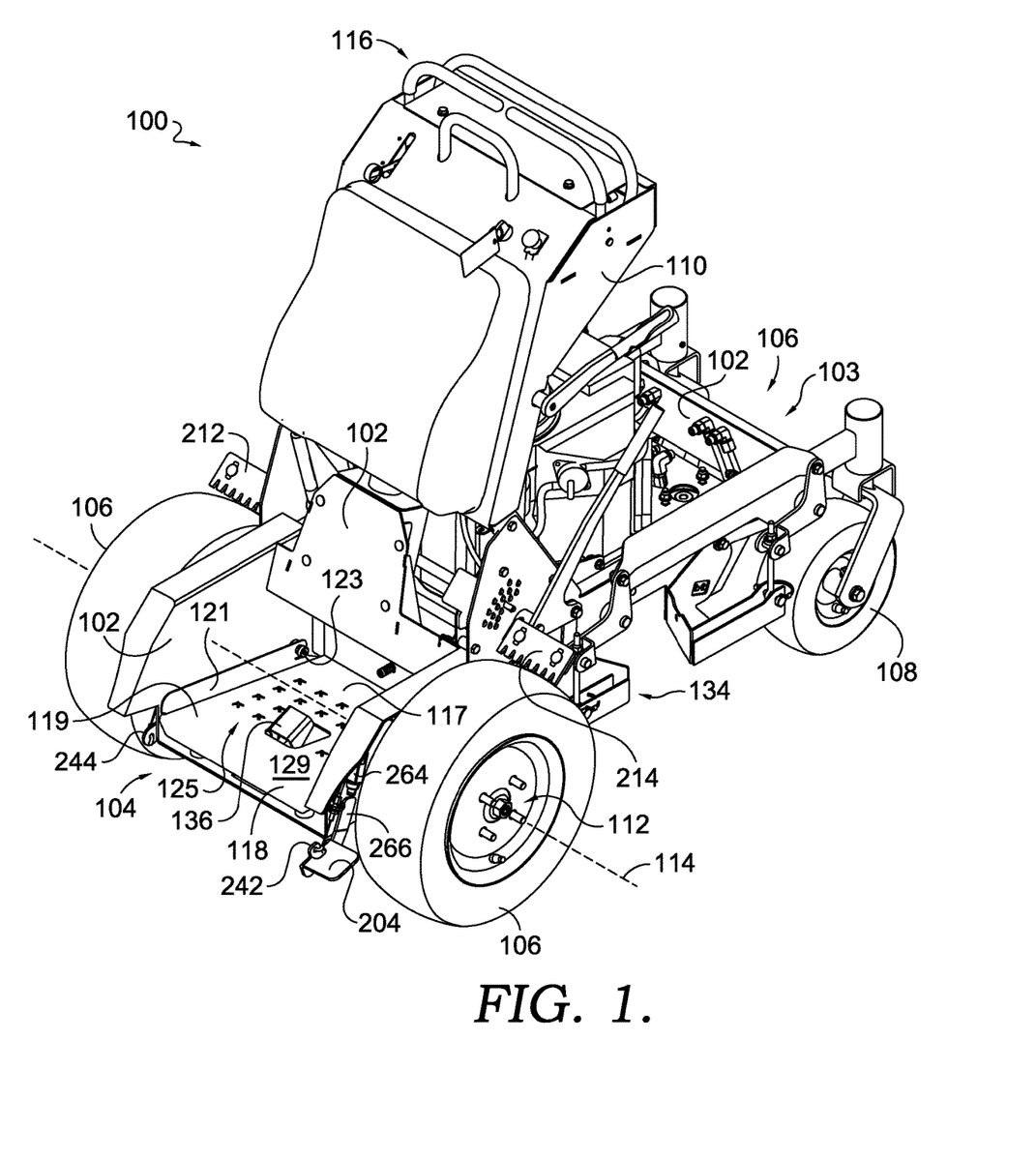
FIG. 1 depicts a perspective view of a stand-on terrain working vehicle having a foot-operated parking brake system, in accordance with aspects hereof.

Turning now to the figures generally, and in particular to FIG. 1, one aspect of a stand-on terrain working vehicle 100 having a parking brake system 200 is shown. The stand-on terrain working vehicle 100 may include a frame 102 having a rear frame end 104 and a front frame end 105. The frame 102 may be carried above a terrain surface by a plurality of wheels. For example, a pair of rear wheels 106 may be coupled to the frame 102 proximate the rear frame end 104. One or more front wheels 108 may be coupled to the frame 102 proximate the front frame end 105. In some aspects, the one or more front wheels 108 may comprise casters.

The frame 102 may support various components and systems of the stand-on terrain working vehicle 100. For example, a propulsion system (e.g., a hydrostatic motor, an engine, etc.), terrain working equipment (e.g., a cutting deck, etc.), an adjustment system for adjusting the terrain working equipment (e.g., a lift assembly), and a control tower 110 may all be coupled to the frame 102. The propulsion system may include one or more hydrostatic motors for driving the pair of rear wheels 106. In some aspects, the stand-on terrain working vehicle 100 may be a zero-turn vehicle driven by the pair of rear wheels 106, which control both the speed and the direction of travel of the stand-on terrain working vehicle 100. In such aspects, the stand-on terrain working vehicle 100 includes two hydrostatic motors to independently drive each wheel of the pair of rear wheels 106.

Figure 2:
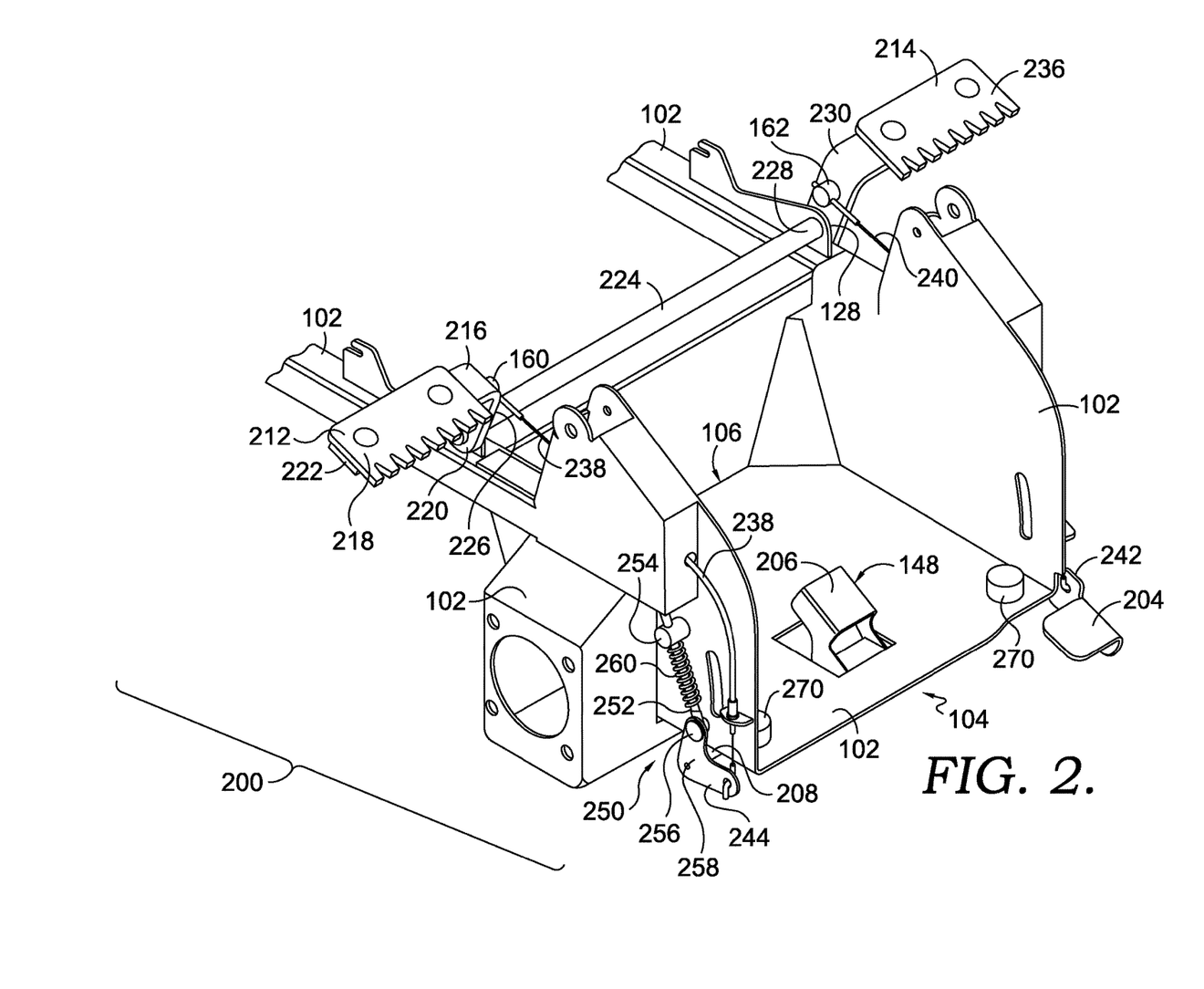
FIG. 2 depicts a perspective view of the parking brake system of FIG. 1, in accordance with aspects hereof.
Figure 3:
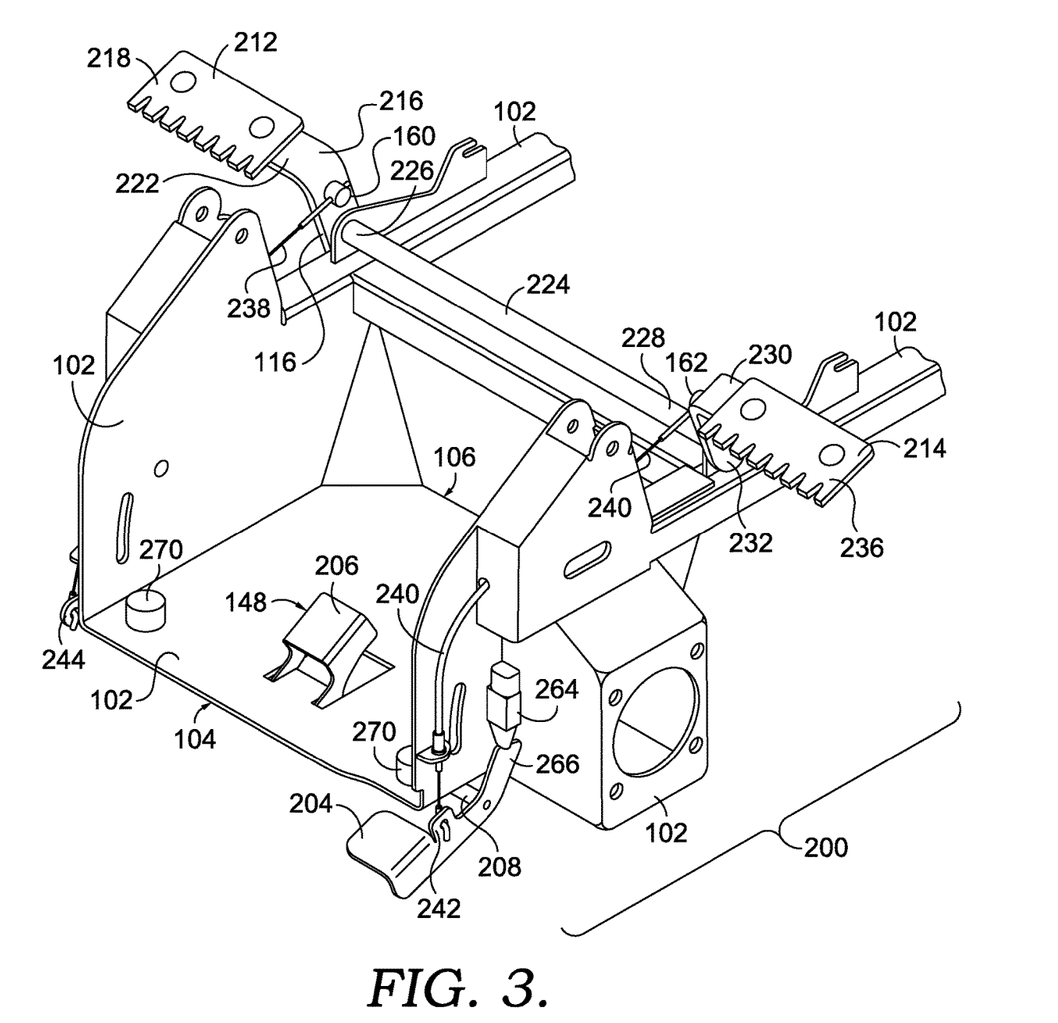
FIG. 3 depicts another perspective view of the parking brake system of FIG. 1, in accordance with aspects hereof.
Figure 4:
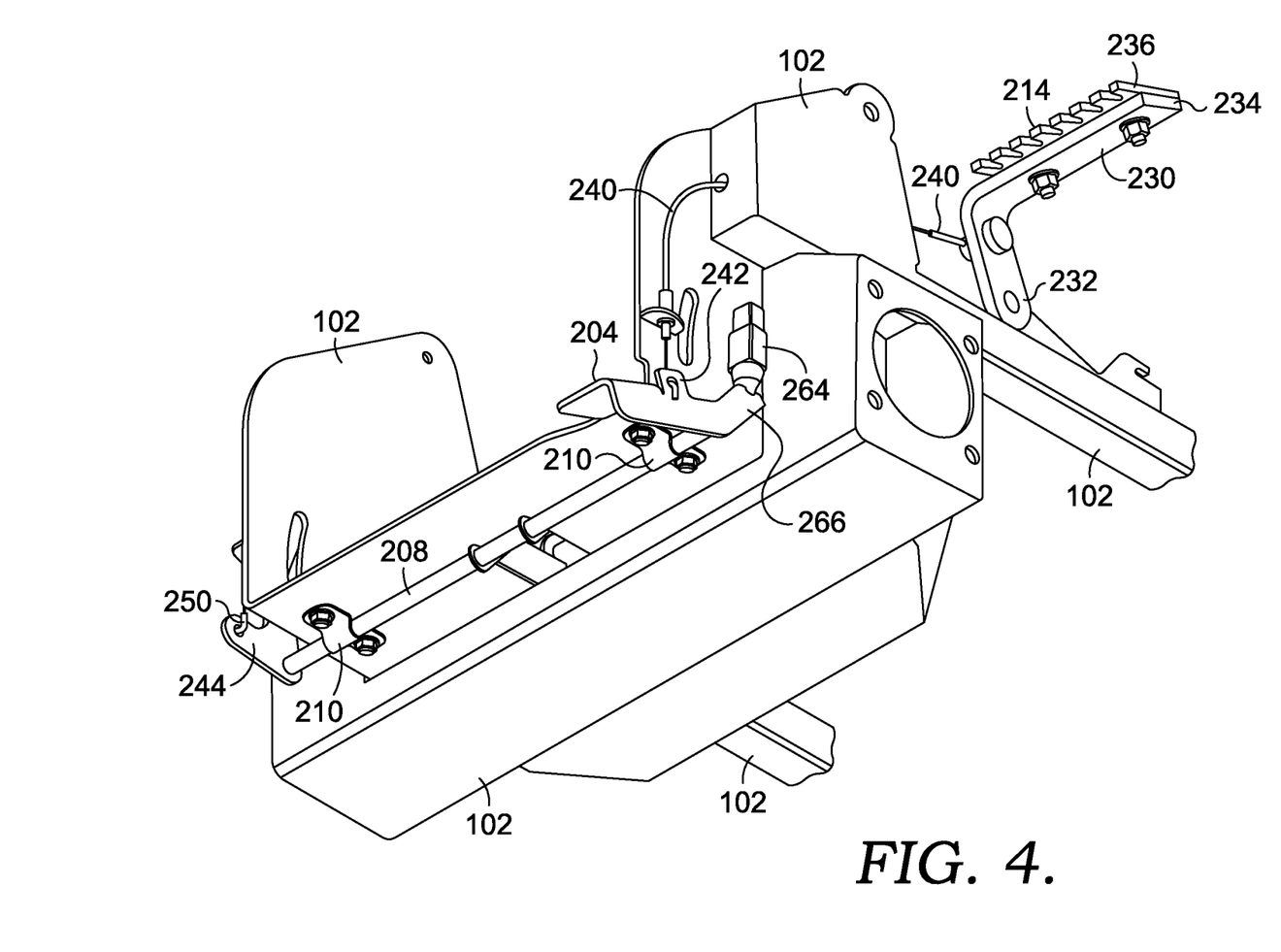
FIG. 4 depicts a bottom perspective view of the parking brake system of FIG. 1, in accordance with aspects hereof.

As seen in FIGS. 2-4, the parking brake system 200 is coupled to the frame 102 and generally includes a pedal assembly, at least one actuator coupled to the pedal assembly, at least one brake coupled to the at least one actuator, and an over-center linkage. In the illustrated aspect, a pedal assembly 202 includes a first pedal 204 and a second pedal 206 each coupled to a pedal shaft 208 (best seen in FIG. 4). The pedal assembly 202 may be rotatably fastened to the frame 102 with rod hangars 210. Two actuators are coupled to the pedal assembly 202 for actuating two brakes between a set/engaged state (seen in FIG. 5B) and a released/disengaged state (seen in FIG. 5A). In some aspects, however, the parking brake system 200 only includes one actuator and one brake. Each actuator may be configured to actuate a respective brake in response to rotation of the pedal shaft 208.

The illustrated brakes comprise a first brake 212 and a second brake 214. The parking brake system 200 is shown in a set/engaged state in FIGS. 1-4 such that the first brake 212 and the second brake 214 are in contact with a respective wheel of the pair of rear wheels 106, thereby preventing further movement of the stand-on terrain working vehicle 100. As will be described, the second pedal 206 of the parking brake system 200 is configured to disengage the first brake 212 and the second brake 214 from the pair of rear wheels 106 when the operator depresses the second pedal 206, thereby disengaging the parking brake system 200.

As can be appreciated, each wheel of the pair of rear wheels 106 is coupled to an axle, for example axle 112, about which the wheels rotate during operation. Each wheel of the pair of rear wheels 106 provides a ground engagement surface for the stand-on terrain working vehicle 100. For example, each wheel may be comprised of a pneumatic tire, an airless tire, or another type of terrain-engaging feature. In the illustrated aspect, the stand-on terrain working vehicle 100 has two axles 112, one for each of the rear wheels 106. A rear wheel axis 114 may extend laterally across the stand-on terrain working vehicle 100 concentrically with the axles 112 of the pair of rear wheels 106. The pair of rear wheels 106 may be driven, for example, by the propulsion system. The propulsion system may comprise one or more hydrostatic motors, electric motors, pneumatic motors, one or more engines, or any other suitable mechanism for driving the pair of rear wheels 106, individually or collectively.

With reference to FIG. 1, the control tower 110 of the stand-on terrain working vehicle 100 may include operator controls 116. Rearward of the control tower 110 is an operator platform 118. During operation of the stand-on terrain working vehicle 100, the operator may stand on the operator platform 118. The operator platform 118 may be coupled to the frame 102 at the rear frame end 104. In some aspects, the operator platform 118 is pivotally coupled to the frame 102 at a front end 117 of the operator platform 118. The operator platform 118 may be a panel. In the illustrated aspect, the operator platform 118 is a rectangular panel having a first lip 121 on a left-hand side of the rectangular panel and a second lip (not shown) on a right-hand side of the rectangular panel. The operator platform 118 shown in FIG. 1 is pivotally coupled to the frame 102 with a first bolt 123 that extends through the first lip 121 and a second bolt (not shown) that extends through the second lip (not shown). The pivotal coupling could be achieved through other means besides bolts (e.g., pivot pins, shafts, rivets, etc.), in accordance with some aspects. Although the second lip and the second bolt are not shown, it is contemplated that these features are reciprocal in nature to the first lip and the first bolt. The first lip 121 and the second lip may comprise a portion of the rectangular panel that has been bent (or otherwise formed) to extend at an angle to the rectangular panel. Also as shown in FIG. 1, the operator platform 118 includes a traction enhancing surface feature 125.

In other aspects, however, the stand-on terrain working vehicle 100 does not include an operator platform 118 and the operator stands on a portion of the frame 102. For example, the frame 102 includes an operator well 127 at the rear frame end 104. The operator well 127 comprises one or more panels defining a space for the operator to stand-on the mower. In the illustrated aspect, vertically-extending side panels separate the operator well 127 from each of the pair of drive wheels 106. The vertically-extending side panels and the one or more panels of the operator well 127 are shown in FIGS. 1-4 as a single, integral structure. In other aspects, however, the vertically-extending side panels and/or the one or more panels may each be individual components coupled together and/or coupled to the frame.

Referring to FIGS. 2-4, perspective views of a rear portion of the stand-on terrain working vehicle 100 and the coupling between the parking brake system 200 and the frame 102 are depicted. Various features of the stand-on terrain working vehicle 100 have been hidden in order to provide a less obstructed view of the parking brake system 200.

FIG. 2 depicts the stand-on terrain working vehicle 100 and the parking brake system 200 from above, behind, and to the left. FIG. 3 depicts a perspective view of the stand-on terrain working vehicle 100 and the parking brake system 200 from above, behind, and to the right. FIG. 4 depicts another perspective view of the stand-on terrain working vehicle 100 and the parking brake system 200 from beneath, behind, and to the right. The parking brake system 200 is shown in the set/engaged state in FIGS. 2-4. That is, the first pedal 204 has been depressed, which rotates the pedal shaft 208 (seen in FIG. 4) resulting in the actuators (e.g. first actuator 238 and second actuator 240) causing the brakes to engage with the pair rear wheels 106 (seen in FIG. 1).

Figure 5A:
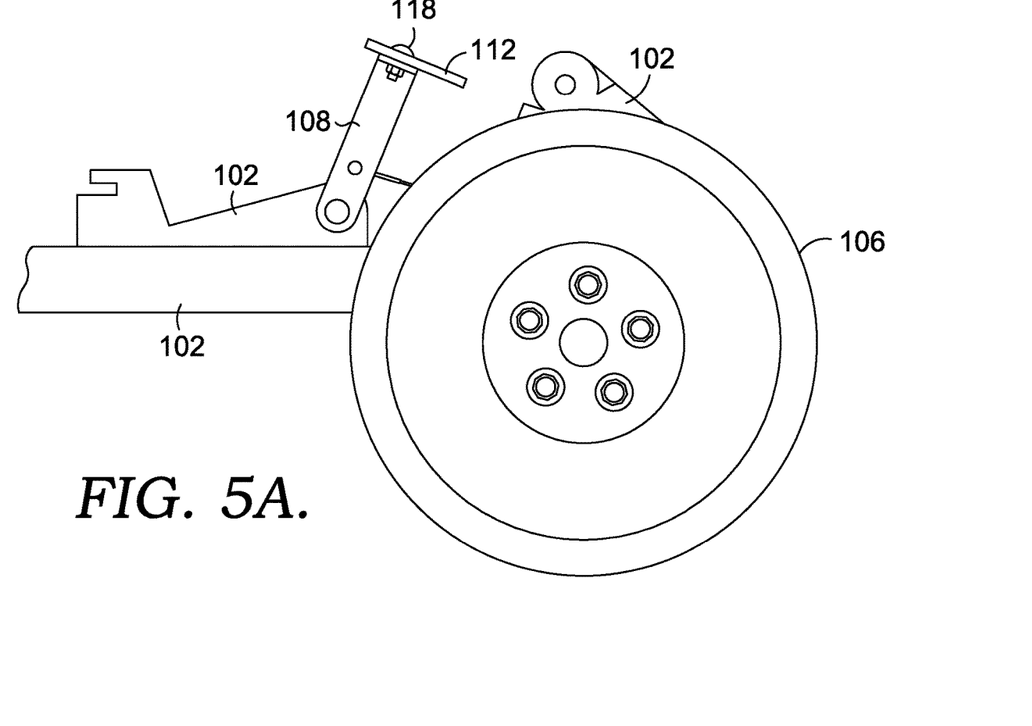
FIG. 5A depicts a side view of the parking brake system of FIG. 1 in which the parking brake system is in a disengaged position, in accordance with aspects hereof.

The first brake 212 and the second brake 214 may be rotatably coupled to the frame 102 and configured to move between a set/engaged position (seen in FIG. 5B) and a released/disengaged position (seen in FIG. 5A). The first brake 212 may include a first link 216 and a first rake 218. A first end 220 of the first link 216 may be pivotally coupled to the frame 102 and a second end 222 of the first link 216 may be coupled to the first rake 218. The parking brake system 200 also may include a brake shaft 224 that is pivotally coupled to the frame 102. The brake shaft 224 may include a first shaft end 226 opposite a second shaft end 228. The first end 220 of the first link 216 may be coupled (e.g., affixed) to the first shaft end 226. The parking brake system 200 may further include the second brake 214. The second brake 214 may include a second link 230 that has a third end 232 and a fourth end 234. The third end 232 of the second link 230 may be coupled to the second shaft end 228 of the brake shaft 224 and the fourth end 234 of the second link 230 may be coupled to a second rake 236. Thus, the brake shaft 224 may extend laterally across the frame 102 and couple the first link 216 to the second link 230 such that rotation of one said link results in rotation of the other said link. As such, the first brake 212 and second brake 214 may be connected via the brake shaft 224.

The illustrated aspect shown in FIGS. 1-4 includes the first rake 218 and the second rake 236, which are configured to each engage one wheel of the pair of wheels 106. For example, the tines of said rakes may interact with a tire and/or tire tread of the pair of wheels 106.

In some aspects, the brake shaft 224 includes a biasing member (e.g., a torsion spring) that biases the first brake 212 and the second brake 214 towards the released/disengaged position. In other aspects, the brake shaft 224 itself may be the biasing member. In still other aspects, the parking brake system 200 may not include a brake shaft interconnecting the first brake 212 and the second brake 214 such that the first brake 212 may operate independently of the second brake 214.

The parking brake system 200 also comprises a pedal assembly 202 that is rotatably coupled to the frame 102. The pedal shaft 208 (seen in FIG. 4) may be coupled to the frame 102 with one or more rod hangars 210 (seen in FIG. 4). As discussed above, the pedal assembly 202 may include the first pedal 204 and the second pedal 206. The first pedal 204 may be affixed to, and extend radially from, the pedal shaft 208. The first pedal 204 may extend in a generally rearward direction relative to the stand-on terrain working vehicle 100. The second pedal 206 may be affixed to, and extend radially from, the pedal shaft 208. The second pedal 206 may extend in a generally forward direction relative to the stand-on terrain working vehicle 100. Thus, depressing one of said pedals results in the other of said pedals raising. Depressing the first pedal 204 rotates the pedal shaft 208 in a first direction, moving the parking brake system 200 to the set/engaged position. The "first direction" may be referred to as a rearward direction and corresponds to the pedal shaft 208 rotating counter-clockwise when viewed from a right-hand side of the stand-on terrain working vehicle 102.

Depressing the second pedal 206 rotates the pedal assembly 202 in a similar manner as the first pedal 204, but in a second direction that is opposite the first direction. The "second direction" may be referred to as a forward direction and corresponds to the pedal shaft 208 rotating clockwise when viewed from a right-hand side of the stand-on terrain working vehicle. In the illustrated aspect, the second pedal 206 rotates the second pedal 206 in a forward direction or towards the front frame end 105. When the second pedal 206 is depressed, the first and second brakes 212 and 214 disengage from the pair of wheels 106 (shown in FIG. 5A) and are moved from the set/engaged position to the released/disengaged position.

In other aspects, however, it is contemplated that the first pedal 204 may extend in a forward direction or towards the front frame end 105 of the stand-on terrain working vehicle 100 and the second pedal 206 may extend in a rearward direction or towards the rear frame end 104. In these aspects, depressing the pedals would cause the pedal shaft 208 to rotate in opposite directions from those described in the preceding paragraphs.

While the pedal assembly 202 has been described as discrete components (e.g., the first pedal 204, the second pedal 206, and the pedal shaft 208) affixed to one another (e.g., by welding or fastening), it is contemplated that in other aspects the pedal assembly 202 may be comprised of a unitary structure such that the first pedal 204 and the second pedal 206 are integral with the pedal shaft 208 (e.g., each component may be cast in a unitary mold).

The pedal assembly 202 controls the actuation of the first brake 212 and the second brake 214 via one or more actuators. The one or more actuators are configured to cause the first brake 212 and the second brake 214 to move between the set/engaged state and the released/disengaged state in response to an operator depressing the first pedal 204 and the second pedal 206, respectively. In the illustrated aspect, the one or more actuators comprise a first actuator 238 and a second actuator 240. In this aspect, the first actuator 238 is coupled to the pedal assembly 202 and to the first brake 212. Likewise, the second actuator 240 is coupled to the pedal assembly 202 and the second brake 214. In some aspects, the one or more actuators may be coupled to a respective pedal assembly via a threaded connection (e.g., threaded end of actuator received by a through hole that is itself threaded or which allows the end to pass completely through to a nut).

The one or more actuators may comprise push/pull cables, as in the illustrated aspect. It is contemplated, however, that the one or more actuators may be any type of actuator (e.g., fly by wire electric actuators, mechanical linkage, etc.) that provides the functions described (e.g., actuation of the first brake 212 and the second brake 214 in response to rotational movement of the pedal shaft 208 and/or depression of the first pedal 204 and the second pedal 206). Although the illustrated aspect includes two actuators, some aspects may only have one actuator for actuating both brakes (e.g., when the brakes are connected via the brake shaft 224).

In the illustrated aspect, the second actuator 240 is coupled to the pedal assembly 202 at a first flange 242. The first flange 242 extends from the first pedal 204 in the illustrated aspect, but may extend from any portion of the pedal assembly 202 (e.g., the pedal shaft 208). Similarly, the first actuator 238 is coupled to the pedal assembly 202 at a second flange 244. The second flange 244 extends radially from the pedal shaft 208, in the illustrated aspect. Another portion (e.g., an opposing end) of the first actuator 238 is coupled to the first link 216 of the first brake 212, in the illustrated aspect. Likewise, another portion (e.g., an opposing end) of the second actuator 240 is coupled to the second link 230 of the second brake 214.

Figure 6:
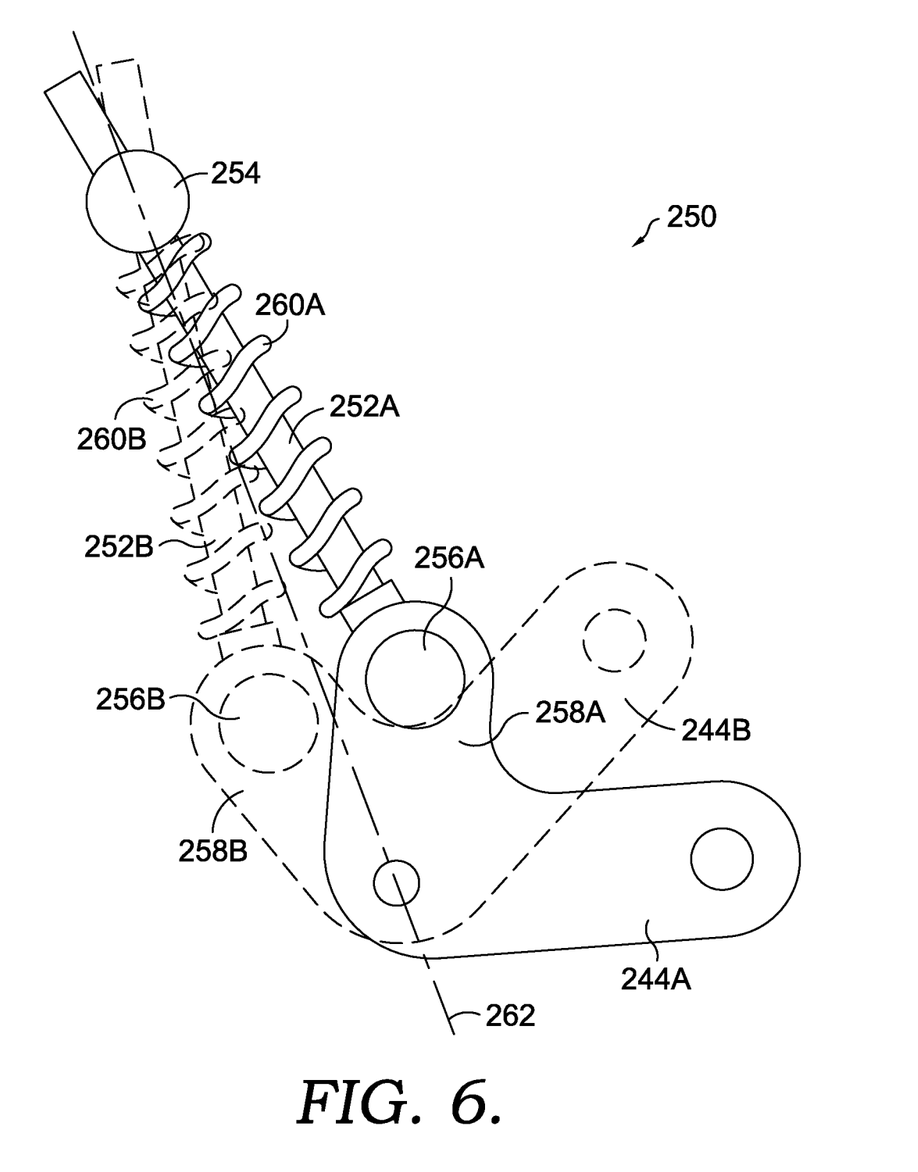
FIG. 6 depicts an over-center linkage in a first state (illustrated with solid lines) and in a second state (illustrated with dashed lines) and that may be coupled to a frame and a pedal assembly of the parking brake system of FIG. 1, in accordance with aspects hereof.

The parking brake system 200 also comprises an over-center linkage 250 (best seen in FIGS. 2 and 6) that is coupled to the frame 102 and the pedal assembly 202. The over-center linkage 250 biases the pedal assembly 202 to stay in the set/engaged state when the first pedal 204 is depressed and biases the pedal assembly 202 to stay in the released/disengaged state when the second pedal 206 is depressed. For example, the pedal assembly 202 is illustrated in the set/engaged state in FIG. 6 by the solid lines, and elements may be illustrated with common element "A" added to the reference number. The over-center linkage 250 biases the pedal assembly 202 to stay in the released state when the first pedal 204 is not depressed and when the second pedal 206 is depressed. For example, the pedal assembly may be illustrated in the disengaged state in FIG. 6 by the dashed lines and common elements may be illustrated with element "B" added to the reference number.

The over-center linkage 250 includes a first link 252 that is slidably coupled to a first pivot member 254 and a second link pivotally coupled to the first link 252 at a second pivot point 256. The first pivot member 254 is pivotally coupled to the frame 102. In the illustrated aspect, the second link is integrally formed with the pedal assembly 202 as a third flange 258 that extends radially from the pedal shaft 208. In the illustrated aspect, the over-center linkage 250 includes a biasing member 260 that is coupled to the first link 252. The biasing member 260 urges the second pivot point 256 to stay on a first side of a center line 262 when the pedal assembly 202 is in the set/engaged state (seen in FIG. 5B) or on a second side of the center line 262 when the pedal assembly 202 is in the released/disengaged state (seen in FIG. 5A). The center line 262 in the illustrated aspect comprises a line extending through the first pivot member 254 and the pedal shaft 208. In order for the pedal shaft 208 to rotate, enough force must be applied to one of the pedals to overcome the biasing force applied by the biasing member 260. When the biasing force is overcome, a portion of the first link 252 slides through the first pivot member 254 to allow the second pivot point 256 to cross the center line 262.

In some aspects, the parking brake system 200 may include a catch 264 coupled to the frame 102. The catch 264 may stop a fourth flange 266 that extends from the pedal shaft 208 when the pedal assembly 202 is in the set/engaged position. Thus, the catch 264 prevents the fourth flange 266 from rotating beyond a certain point, thereby preventing over-rotation of the pedal shaft 208. In other words, the catch 264 stops, through physical interference, the rotation of the pedal shaft 208 once the parking brake system 200 is in the set/engaged position.

The second pedal 206 may extend from the pedal shaft 208 through an opening in the frame 102 and into an operator standing area. For example, the operator platform 118 may be coupled to the frame 102 proximate the operator standing area. The operator platform 118 may also include an opening that is aligned with the opening in the frame 102 such that the second pedal 206 may extend therethrough. In operation, when the first pedal 204 is depressed and the parking brake system 200 is in the set/engaged state, the second pedal 206 may extend through the openings in the frame 102 and the operator platform 118 such that a portion of the second pedal 206 is above a top surface 129 of the operator platform 118. When the second pedal 206 is depressed and the parking brake system 200 is in the released/disengaged state, the second pedal 206 may be positioned flush with or recessed below the top surface 129 of the operator platform 118. In aspects where the stand-on terrain working vehicle 100 does not include the operator platform 118, when the second pedal 206 is depressed and the parking brake system 200 is in the released/disengaged state, the second pedal 206 may be positioned flush with or recessed below a top surface of the frame 102 in the operator standing area.

In some aspects, the stand-on terrain working vehicle 100 may include an operator presence detection system 270. The operator presence detection system 270 may be a sensor, a switch, or the like, which is configured to detect the presence of an operator on the stand-on mower. For example, the operator platform 118 may be pivotally coupled to the frame 102 at a front end 117 of the operator platform 118. A rear end 119 of the operator platform 118 may activate the operator presence detection system 270. When an operator stands on the operator platform 118, the operator's weight presses the operator platform 118 into the operator presence detection system 270 triggering the sensor, or closing the switch, or the like. In other aspects, however, an operator detection system may be included at a different location of the stand-on terrain working vehicle 100. For example, rather than being under the operator platform 118, the operator detection system may be incorporated into the operator controls 116 (e.g., the handles, etc.).

Figure 5B:
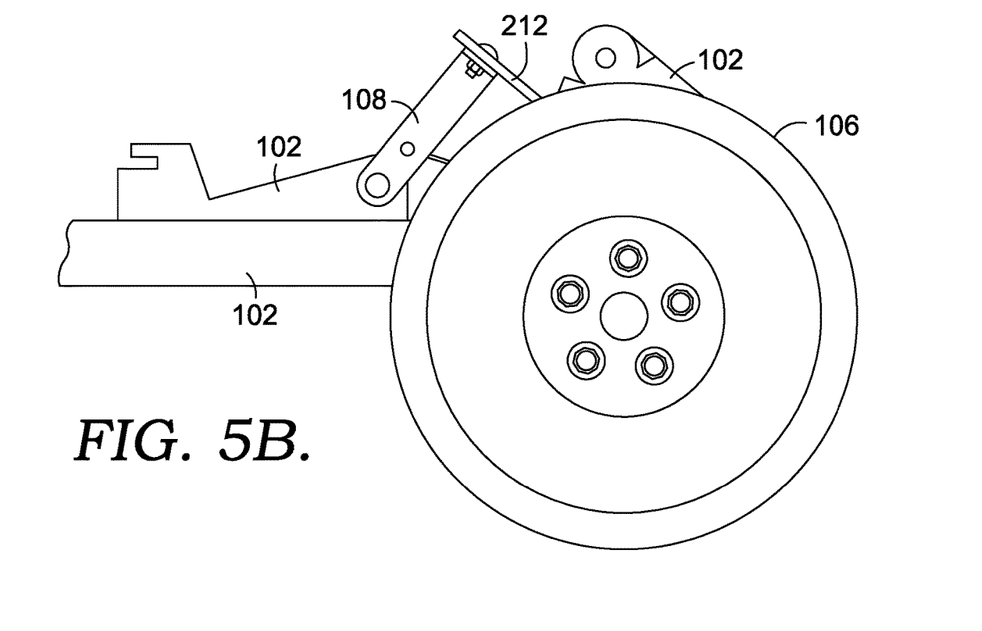
FIG. 5B depicts a side view of the parking brake system of FIG. 1 in which the parking brake system is in an engaged position, in accordance with aspects hereof.

Referring to FIGS. 5A and 5B, side views illustrate the released/disengaged state and the set/engaged state, respectively, of the parking brake system 200. In FIG. 5A, the parking brake system 200 is in the released/disengaged state and the first brake 212 and the second brake 214 are not engaged with the pair of wheels 106. The released/disengaged state occurs when the second pedal 206 has been depressed and the first brake 212 and second brake 214 (not shown in FIG. 5A) have been released from the pair of wheels 106. In FIG. 5B, the parking brake system 200 is in the set/engaged state and the first brake 212 and the second brake 214 are engaged with the pair of wheels 106. The set/engaged state occurs when the first pedal 204 has been depressed and the first brake 212 and the second brake 214 (not shown in FIG. 5B) have been engaged with the pair of wheels 106.

It should be noted that in other aspects, the first brake 212 and the second brake 214 may engage other portions of the stand-on terrain working vehicle 100 other than the pair of wheels 106 when the parking brake system 200 is in the set/engaged state. For example, said brakes may comprise a disc brake, a drum brake, a band brake, and the like. In these aspects, the one or more actuators may actuate other components of said brakes (e.g., calipers, shoes, band, etc.). Thus, said brakes may engage a brake disc, a brake drum, an axle, etc.

Figure 7:
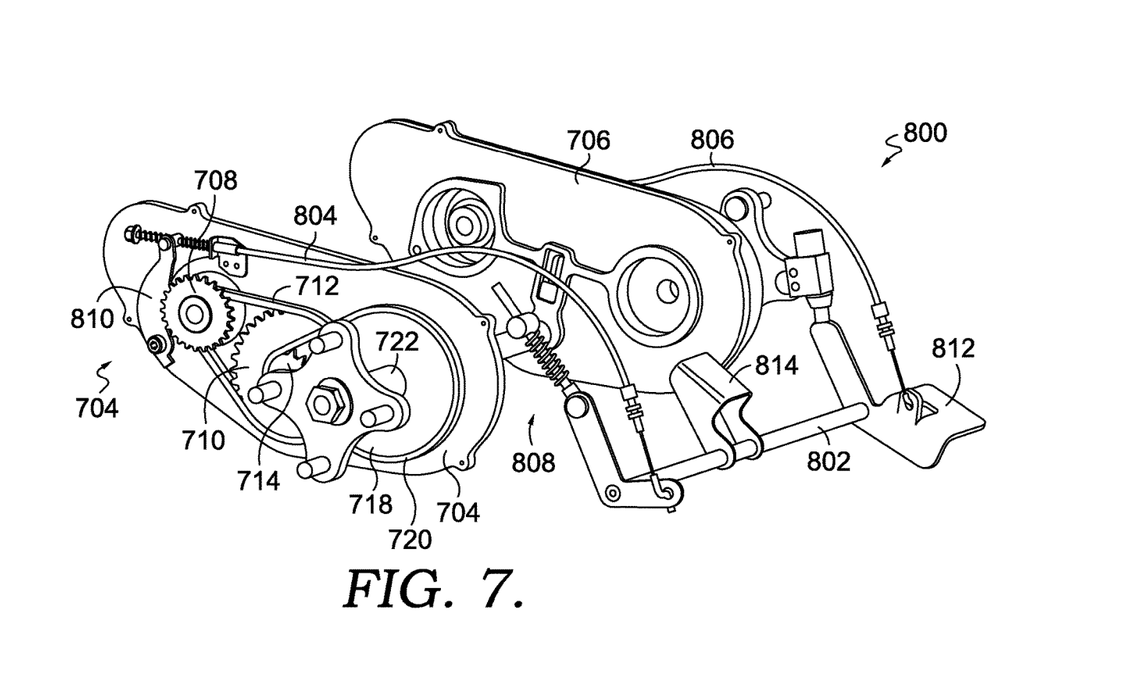
FIG. 7 depicts a perspective view of another parking brake system for a stand-on terrain working vehicle where the parking brake system is in a disengaged positon, in accordance with aspects hereof.
Figure 8:
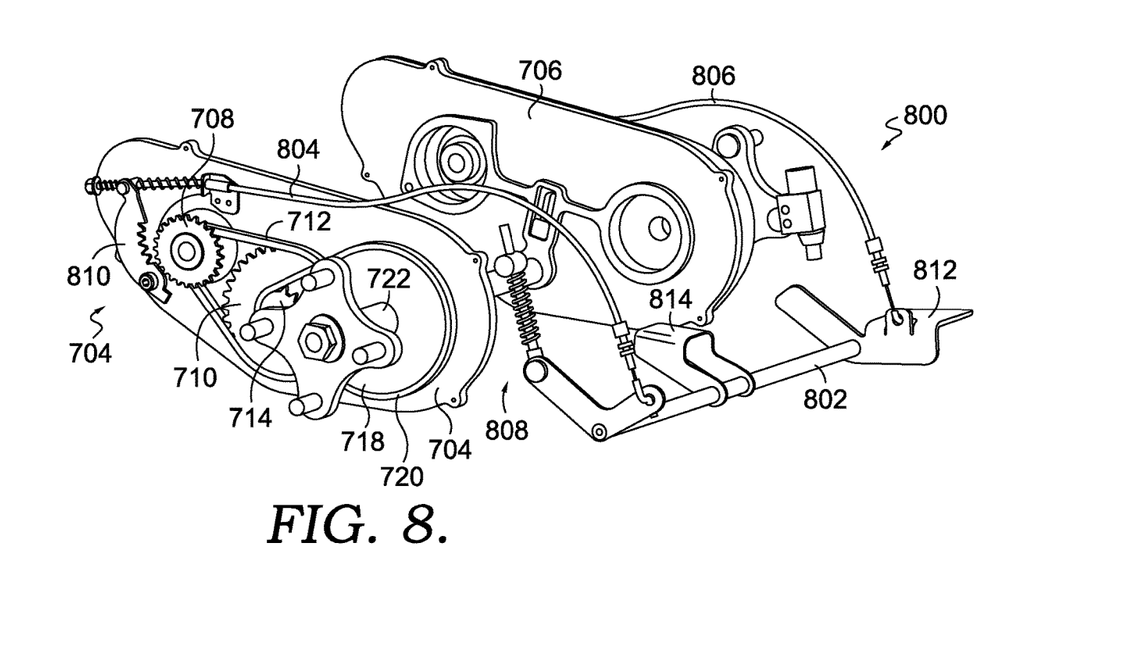
FIG. 8 depicts a perspective view of the parking brake system of FIG. 7 where the parking brake system is in an engaged positon, in accordance with aspects hereof.
Figure 9:
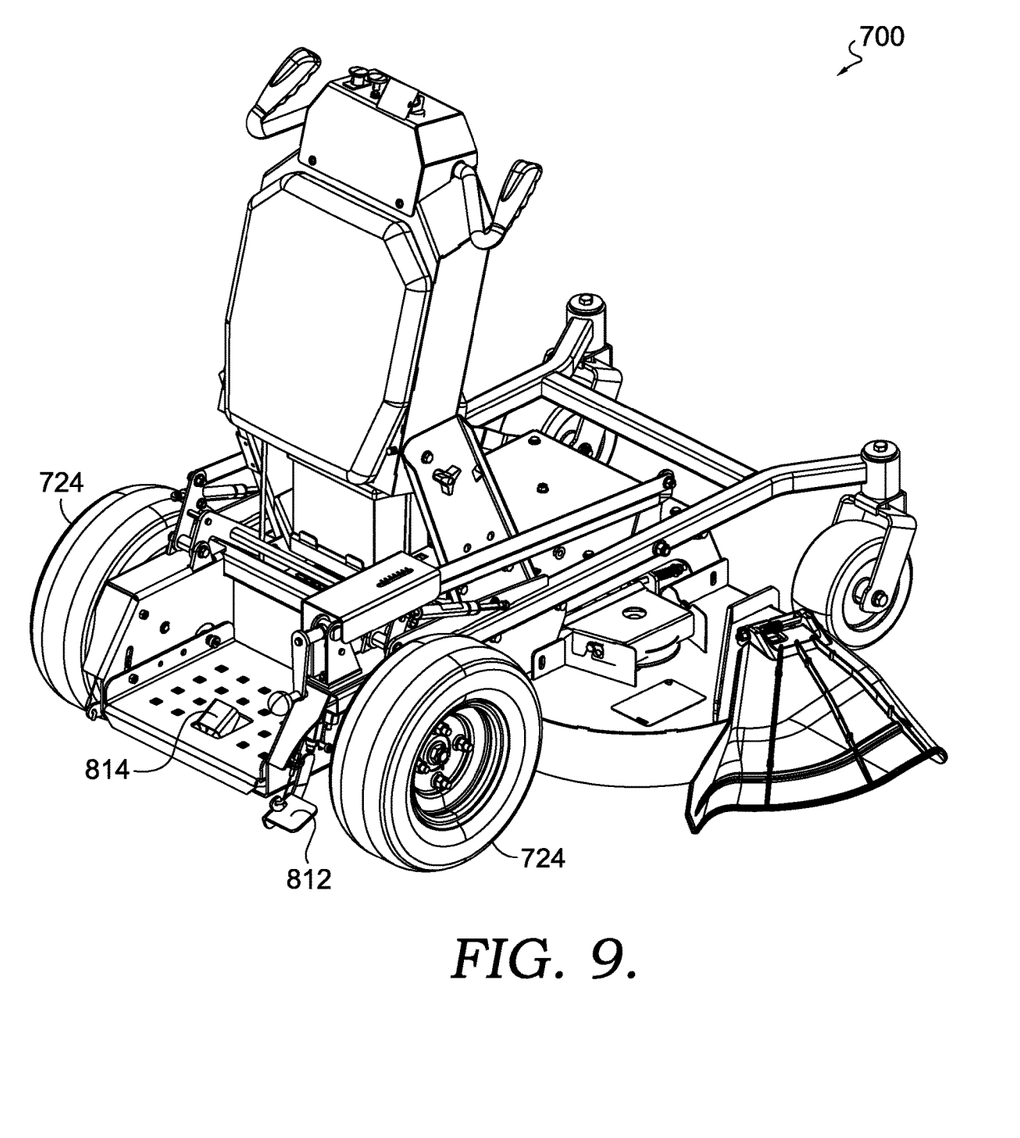
FIG. 9 depicts a perspective view of a stand-on terrain working vehicle including the parking brake system of FIG. 7, in accordance with aspects hereof.

Turning to FIGS. 7-9, an alternative aspect of a parking brake system 800 for a stand-on terrain working vehicle 700 is illustrated. FIG. 7 depicts the parking brake system 800 in the set/engaged state. FIG. 8 depicts the parking brake system 800 in the released/disengaged state. The primary difference between the stand-on terrain working vehicle 700 illustrated in FIG. 9 and the stand-on terrain working vehicle 100 illustrated in FIG. 1 is that the former is a chain-drive vehicle, while the latter is a hydrostatic motor drive vehicle. Most of the other components and systems between the vehicles are otherwise substantially the same, in accordance with some aspects.

FIGS. 7 and 8 illustrate a first chain-drive system 704 and a second chain-drive system 706. The first chain-drive system 704 is substantially a mirror-image of the second chain-drive system 706, thus for sake of brevity only the first chain-drive system 704 will be described below. However, such description applies equally to the second chain-drive system 706, except as specifically noted.

The first chain-drive system 704 may include a plurality of gears coupled to one another by at least one chain. For example, the first chain-drive system 704 includes four gears and two chains. In the illustrated aspect, a first gear 708 is coupled to a second gear 710 by a first chain 712. Also as shown, a third gear 714 is mounted on the same shaft as the second gear 710. The third gear 714 is coupled to a fourth gear 718 by a second chain 720. The fourth gear 718 is mounted on axle 722, which is coupled to rear wheel 724 (seen in FIG. 9). The stand-on terrain working vehicle 700 may include one or more engines, motors, and the like that drive one or more shafts on which at least one of the plurality of gears is mounted. The power input for the one or more engines, motors, and the like is transferred from the one or more shafts to the axle 722 via the at least one chain coupling the plurality of gears together.

Also illustrated in FIGS. 7 and 8 is the parking brake system 800. The parking brake system 800 is very similar to the parking brake system 200 described above and includes a pedal assembly 802, a first actuator 804 and a second actuator 806 each coupled to the pedal assembly 802, and an over-center linkage 808. The pedal assembly 802, the first actuator 804, and the second actuator 806 are identical to the like components described above in reference to the parking brake system 200. In contrast to the parking brake system 200 described above, however, the first actuator 804 is coupled to a first pawl 810 (and the second actuator 806 is coupled to a second pawl). Rather than engaging the rear wheel 724, the first pawl 810 is coupled to the first chain-drive system 704 (and the second pawl is coupled to the second chain-drive system 706) and is configured to engage one of the plurality of gears. For example, in the illustrated aspect the first pawl 810 is configured to engage the first gear 708, which in turn prevents any of the gears from turning and therefore prevents the axle 722 from turning.

Thus, in operation the parking brake system 800 functions in much the same way as the parking brake system 200 described above. The pedal assembly 802 controls the actuation of the first pawl 810 via the first actuator 804. Thus, when a first pedal 812 of the pedal assembly 802 is depressed, the first actuator 804 moves the first pawl 810 into a set/engaged state (seen in FIG. 7). Similarly, when a second pedal 814 of the pedal assembly 802 is depressed, the first actuator 804 moves the first pawl 810 into a released/disengaged state (seen in FIG. 8). The over-center linkage 808 also functions as described above to hold the parking brake system 800 in one of the set/engaged state or the released/disengaged state.

The parking brake system 800 may include a biasing mechanism that holds the pawl in the set/engaged state when the first pedal 812 of the pedal assembly 802 is depressed. The biasing mechanism may also help seat the teeth of the pawl in the teeth of the one of the plurality of gears (e.g., the first gear 708). For example, if the first pedal 812 is depressed and the teeth of the pawl are aligned with the teeth of the one of the plurality of gears, the brake will not lock the stand-on terrain working vehicle 700 in place. Instead, the stand-on terrain working vehicle 700 may move very slightly until the one of the plurality of gears has turned such that its teeth are no longer aligned with the teeth of the pawl. The biasing mechanism then encourages the teeth of the pawl to seat within the teeth of the one of the plurality of gears. The biasing mechanism may also hold the pawl in the released/disengaged state when the second pedal 814 of the pedal assembly 802 is depressed. Thus, the biasing mechanism may force the pawl away from the one of the plurality of gears once the second pedal 814 is depressed.

In some aspects, each biasing mechanism may comprise one or more springs. For example, in the illustrated aspect the biasing mechanism associated with the first pawl 810 includes two springs. The first of these springs biases when the brake is set and the second of these springs biases when the brake is released.

This illustrated aspect of the stand-on terrain working vehicle 700 is a zero-turn mower, thus each of the rear wheels 724 is independently operable. As a result, the second actuator 806 is coupled to the second pawl (not shown) and functions in the same way as the first actuator 804 and the first pawl 810 functions, but with respect to the second chain-drive system 706.

Figure 10:
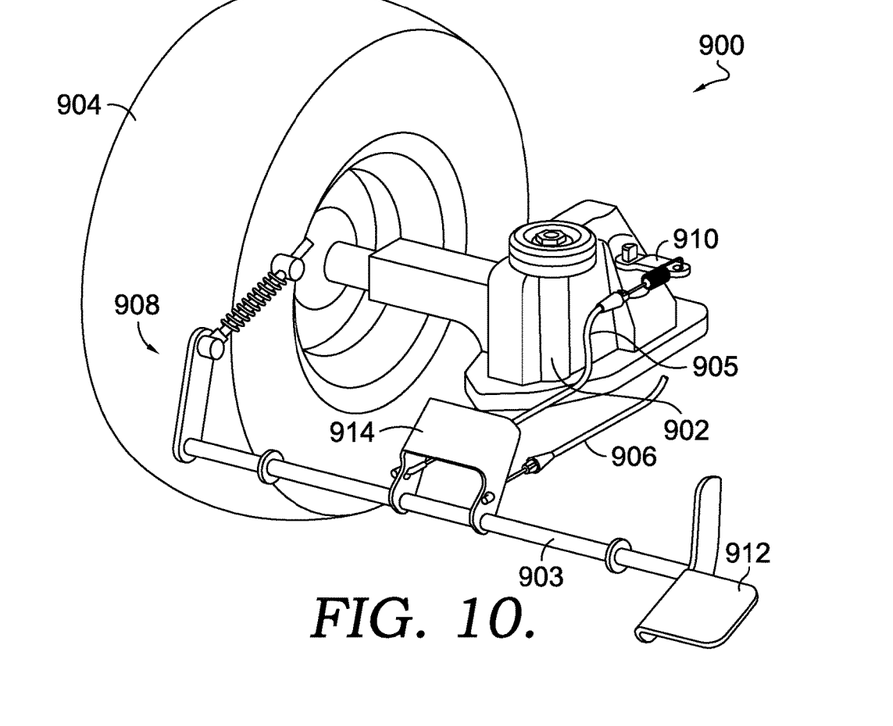
FIG. 10 depicts a perspective view of another parking brake system for a stand-on terrain working vehicle where the parking brake system is in a engaged state.
Figure 11:
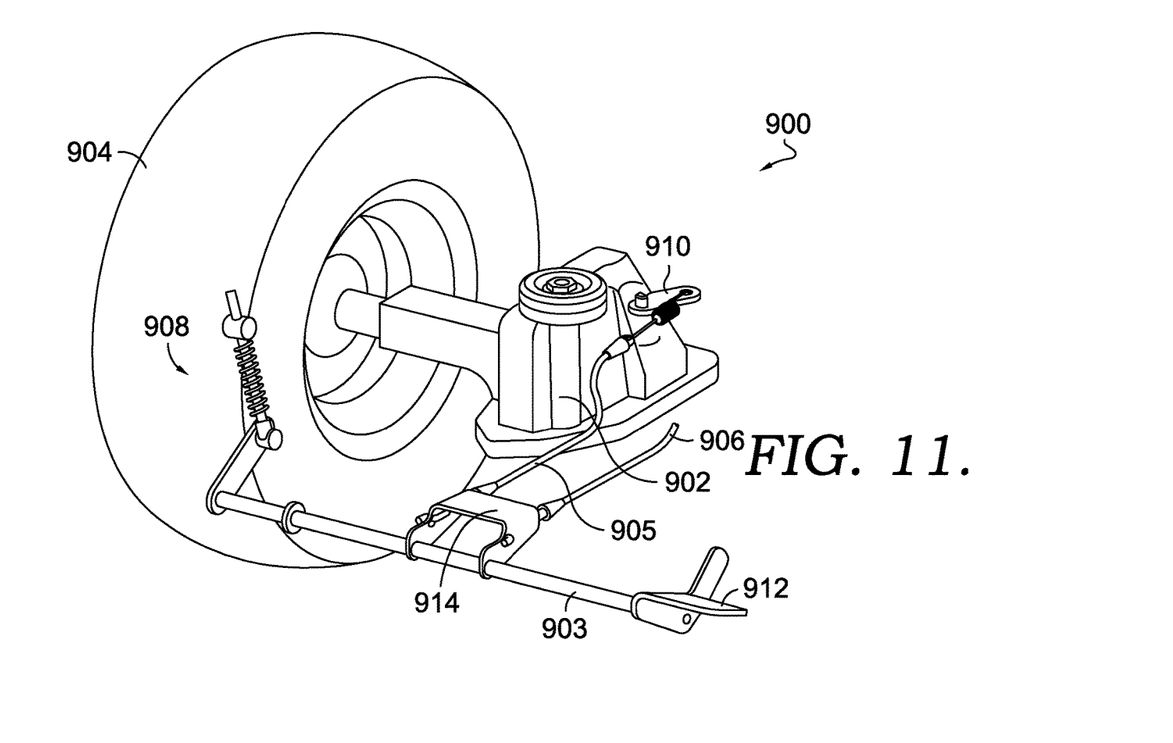
FIG. 11 depicts a perspective view of the parking brake system of FIG. 10 where the parking brake system is in a disengaged state.

Referring to FIGS. 10 and 11, an alternative aspect of a parking brake system 900 for a stand-on terrain working vehicle is illustrated. FIG. 10 depicts the parking brake system 900 in the set/engaged state. FIG. 11 depicts the parking brake system 900 in the released/disengaged state. The primary difference between the parking brake system 900 illustrated in FIGS. 10 and 11 and the parking brake systems 200 and 800 illustrated in FIG. 1-9 is that the brake is incorporated into a hydrostatic motor. Most of the other components and systems between the vehicles are otherwise substantially the same, in accordance with some aspects.

FIGS. 10 and 11 illustrate a hydrostatic motor 902 coupled to a rear-wheel 904 of a stand-on terrain working vehicle. The hydrostatic motor 902 may drive the stand-on terrain working vehicle by turning the rear-wheel 904. In some aspects, a second hydrostatic motor may control a second rear-wheel. When the hydrostatic motor 902 and the second hydrostatic motor are independently controlled, the stand-on terrain working vehicle may be classified as a zero-turn vehicle. The second hydrostatic motor is substantially a mirror-image of the hydrostatic motor 902, thus for sake of brevity only the hydrostatic motor 902 will be described below. However, such description applies equally to the second hydrostatic motor, except as specifically noted.

Also illustrated in FIGS. 10 and 11 is the parking brake system 900. The parking brake system 900 is very similar to the parking brake systems 200 and 800 described above and includes a pedal assembly 903, a first actuator 905 and a second actuator 906 each coupled to the pedal assembly 903, and an over-center linkage 908. The pedal assembly 903, the first actuator 905, and the second actuator 906 are identical to the like components described above in reference to the parking brake system 200, except that the first actuator 905, and the second actuator 906 are coupled to different portions of the pedal assembly 903 (e.g., the second pedal 914) as shown in FIGS. 10 and 11. In contrast to the parking brake system 200 described above, however, the first actuator 905 is coupled to a first lever 910 (and the second actuator 906 is coupled to a second pawl). Rather than engaging the rear wheel 904, the first lever 910 is coupled to an internal portion of the hydrostatic motor 902 (e.g., in some aspects this may be a pawl similar to that described in reference to the parking brake system 800) and is configured to prevent rotation of the output shaft of the hydrostatic motor 902 and therefor prevent rotation of the rear-wheel 904.

Thus, in operation the parking brake system 900 functions in much the same way as the parking brake systems 200 and 800 described above. The pedal assembly 903 controls the actuation of the first lever 910 via the first actuator 905. Thus, when a first pedal 912 of the pedal assembly 903 is depressed, the first actuator 905 moves the first lever 910 into a set/engaged state (seen in FIG. 10). Similarly, when a second pedal 914 of the pedal assembly 903 is depressed, the first actuator 905 moves the first lever 910 into a released/disengaged state (seen in FIG. 11). The over-center linkage 908 also functions as described above to hold the parking brake system 900 in one of the set/engaged state or the released/disengaged state.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

Some aspects of this disclosure have been described with respect to the illustrative examples provided by FIGS. 1-11. Additional aspects of the disclosure will now be described that may be related to subject matter included in one or more claims of this application, or one or more related applications, but the claims are not limited to only the subject matter described in the below portions of this description. These additional aspects may include features illustrated by FIGS. 1-11, features not illustrated by FIGS. 1-11, and any combination thereof. When describing these additional aspects, reference may or may not be made to elements depicted by FIGS. 1-11.

One aspect disclosed herein is directed to a parking brake system for a stand-on terrain working vehicle, such as a lawn mower. In some aspects, the parking brake system may comprise a brake, a pedal assembly, an over-center linkage, and an actuator. In this aspect, the brake may be rotatably coupled to a frame and configured to move between an engaged position and a disengaged position. The pedal assembly may also be rotatably coupled to the frame and comprise a first pedal that rotates the pedal assembly in a first direction to a set position when depressed and a second pedal that rotates the pedal assembly in a second direction to a released position when depressed. The over-center linkage of this aspect may be coupled to the frame and the pedal assembly and may bias the pedal assembly to stay in the set position when the first pedal is depressed and bias the pedal assembly to stay in the released position when the second pedal is depressed. Additionally, in this aspect, the actuator may cause the brake to move to the engaged position when the pedal assembly moves to the set position and may cause the brake to move to the disengaged position when the pedal assembly moves to the released position.

In some aspects, the parking brake system's brake may comprise a first link having a first end and a second end with the first end pivotally coupled to the frame and the second end coupled to a rake. Additionally, the brake may comprise a second link that has a third end and a fourth end opposite the third end, where the third end of the second link is coupled to the second shaft end and the fourth end of the second link is coupled to the second rake. The brake may further comprise a first shaft that is pivotally coupled to the frame and has a first shaft end that is opposite a second shaft end, where the first end of the first link is coupled to the first shaft end In additional aspects, the actuator may be coupled to the first link and may be a push-pull cable. Additionally, the system may comprise a second actuator that is coupled to the pedal assembly and the second link.

In further aspects, the pedal assembly of the parking brake system may further comprise a second shaft that is rotatably coupled to the frame. In this aspect, the first pedal may extend radially out from the shaft in at least a partially rearward direction relative to the frame while the second pedal may extend radially out from the shaft in at least a partially forward direction relative to the frame.

The parking brake system may further comprise a catch that is coupled to the frame and a flange that extends radially from the shaft, where the catch stops the flange from rotating when the pedal assembly is in the set position. Additionally, the over-center linkage, in this aspect, may comprise a first link that is pivotally coupled to the frame and a second flange that extends radially from the shaft. The first link of the over-center linkage may be pivotally coupled to the second flange at a first pivot point.

Another aspect disclosed herein is directed to a mower that comprises a mower frame having an operator stand-on platform, a brake that is pivotally coupled to the mower frame, a wheel rotatably coupled to the mower frame proximate to the operator stand-on platform, a pedal assembly pivotally coupled to the mower frame, a push-pull cable, and a first link pivotally coupled to the mower frame. In this aspect, the pedal assembly has a first pedal and a second pedal that each radially extend from a shaft. The first pedal extends at least partially in a rearward direction of the mower while the second pedal extends at least partially in a forward direction of the mower. The push-pull cable of this aspect has a first end and a second end opposite the first end, where the first end is coupled to the first pedal and the second end is coupled to the brake. The first link of this aspect is pivotally coupled to a second link that is coupled to the shaft. A biasing member is coupled to one of the first link and the second link, thereby urging the pivot point to stay either in a first position where the brake is engaged with the wheel and the first pedal is depressed or in a second position where the brake is disengaged from the wheel and the second pedal is depressed.

Additionally, in this aspect, the mower comprises a second wheel that is rotatably coupled to the mower frame proximate to the operator stand-on platform, a second brake pivotally coupled to the mower frame, and a second push-pull cable having a first end opposite a second end, where the first end is coupled to the pedal assembly and the second end is coupled to the second brake. This aspect may further comprise an operator presence detection system that has a plate that is pivotally coupled to the operator stand-on platform. The plate of the operator presence detection system may comprise an aperture that allows the second pedal to pass through the plate. Additionally, the mower may comprise a hydrostatic drive system that is coupled to the mower frame.

In yet another aspect disclosed herein a stand-on terrain working vehicle that comprises a frame, a chain-drive system coupled to the frame, the chain-drive system having a plurality of gears and a chain engaged with the plurality of gears, a wheel coupled to the chain-drive system, a pawl pivotally coupled to the chain-drive system, a pedal assembly, an over-center linkage pivotally coupled to the frame, and an actuator. In this aspect, the pawl that is coupled to the chain-drive system is configured to move between an engaged and disengaged positon. The engaged position occurs when the pawl engages one gear of a plurality of gears to prevent rotation of the gear(s). In the disengaged position, the pawl is retracted from each of the gears of the plurality of gears. In this aspect, the pedal assembly has a shaft that is rotatably coupled to the frame, a first pedal that extends radially from a first end of the shaft at least partially in a rearward direction of the frame, a second pedal that extends radially from an intermediate portion of the shaft at least partially in a forward direction of the frame, and a flange that extends radially from a second end of the shaft. The over-center linkage of this aspect is coupled to the frame on a first end and pivotally coupled to the flange on a second end. The actuator is coupled to the first pedal and extends between the pawl and the pedal assembly. As such, when the first pedal is depressed, it causes the shaft to rotate in a first direction and the actuator causes the pawl to move into the engaged position. By contrast, when the second pedal is depressed, it causes the shaft to rotate in a second direction and the actuator causes the pawl to move into the disengaged position. Additionally, the over-center linkage holds the rotated shaft in one of a first position and a second position, wherein the first position is associated with the pawl being in the engaged position, wherein the second position is associated with the pawl being in the disengaged position. This aspect may further comprise a biasing assembly that is coupled to the chain-drive system and configured to urge the pawl into the disengaged position.

In this aspect, the stand-on terrain working vehicle further comprises a second chain-drive system coupled to the frame, the second chain-drive system having a plurality of gears and a chain engaged with the plurality of gears, a second wheel coupled to the second chain-drive system, a second pawl pivotally coupled to the second chain-drive system and configured to move between an engaged position and a disengaged position, and a second actuator coupled between the second pawl and a second flange, the second flange extending radially from a second end of the shaft. The rotation of the shaft in the first direction causes the second actuator to move the second pawl to an engaged position, while the rotation of the shaft in the second direction causes the second actuator to move the second pawl to a disengaged position.

Further, in this aspect, the stand-on terrain working vehicle may also comprise a third flange that extends radially from the shaft and a catch that is coupled to the chain-drive system. As such, when the shaft rotates in the first direction, it is stopped by the catch when the second pawl has moved into the engaged position.

Aspects hereof may be described using directional terminology. For example, the Cartesian coordinate system may be used to describe positions and movement or rotation of the features described herein. Accordingly, some aspects may be described with reference to three mutually perpendicular axes. The axes may be referred to herein as lateral, longitudinal, and vertical, and may be indicated by reference characters X, Y, and Z, respectively, in the accompanying figures. For example, the terms "horizontal" and "horizontally" as used herein refer to direction and describe an orientation generally parallel to the surface of the earth or a longitudinal direction of the terrain working vehicle frame. Accordingly, the terms "vertical" and "vertically" as used herein refer to a direction perpendicular to, or more perpendicular than parallel to, horizontal. For example, the terms "vertical" and "vertically" as used herein refer to a direction perpendicular to each of the lateral and longitudinal axes. Additionally, relative location terminology will be utilized herein. For example, the term "proximate" is intended to mean on, about, near, by, next to, at, and the like. Therefore, when a feature is proximate another feature, it is close in proximity but not necessarily exactly at the described location, in some aspects. Additionally, the term "distal" refers to a portion of a feature herein that is positioned away from a midpoint of the feature.

Additionally, the terms "superior," "superior to," and "above" are intended to mean that features herein are nearer an uppermost portion of the terrain working vehicle than a lowermost portion of the terrain working vehicle, as compared to other features. Accordingly, the terms "inferior," "inferior to," and "below" are intended to mean that features herein are nearer a lowermost portion of the terrain working vehicle than the uppermost portion of the terrain working vehicle, as compared to other features. Further, the terms "forward" and "forward of" are intended to mean that features herein are nearer a front most portion of the terrain working vehicle than a rearmost portion of the terrain working vehicle, as compared to other features. Conversely, "rearward" and "rearward of" are intended to mean that features herein are nearer a rearmost portion of the terrain working vehicle than a front most portion of the terrain working vehicle, as compared to other features.

Additionally, although some exemplary implementations of the embodiments described herein are shown in the accompanying figures, these implementations are not intended to be limiting. Rather, it should be understood that the various embodiments and aspects described herein may be implemented upon any mower having a cutting deck suspended therefrom.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

The invention claimed is:

1. A parking brake system for a stand-on terrain working vehicle comprising:
   a brake rotatably coupled to a frame and configured to move between an engaged position and a disengaged position;
   a pedal assembly rotatably coupled to the frame, the pedal assembly comprising:
      a first pedal that rotates the pedal assembly in a first direction to a set position when depressed; and
      a second pedal that rotates the pedal assembly in a second direction to a released position when depressed;
   an over-center linkage coupled to the frame and the pedal assembly and biasing the pedal assembly to stay in the set position when the first pedal is depressed and biasing the pedal assembly to stay in the released position when the second pedal is depressed; and
   an actuator coupled to the brake and the pedal assembly, wherein the actuator causes the brake to move to the engaged position when the pedal assembly moves to the set position, wherein the actuator causes the brake to move to the disengaged position when the pedal assembly moves to the released position.

2. The parking brake system of claim 1, wherein the brake comprises a first link having a first end and a second end, the first end pivotally coupled to the frame and the second end coupled to a rake.

3. The parking brake system of claim 2, wherein the actuator is coupled to the first link.

4. The parking brake system of claim 2, wherein the brake further comprises:
   a shaft pivotally coupled to the frame and comprising a first shaft end opposite a second shaft end, the first end of the first link being coupled to the first shaft end; and
   a second link having a third end and a fourth end, the third end of the second link being coupled to the second shaft end, the fourth end of the second link coupled to a second rake.

5. The parking brake system of claim 4, further comprising a second actuator coupled to the pedal assembly and the second link.

6. The parking brake system of claim 1, wherein the actuator comprises a push-pull cable.

7. The parking brake system of claim 1, wherein the pedal assembly further comprises a shaft rotatably coupled to the frame, wherein the first pedal extends radially out from the shaft in at least a partially rearward direction relative to the frame, wherein the second pedal extends radially out from the shaft in at least a partially forward direction relative to the frame.

8. The parking brake system of claim 7, further comprising:
a catch coupled to the frame;
a flange extending radially from the shaft, wherein the catch stops the flange from rotating when the pedal assembly is in the set position.

9. The parking brake system of claim 7, wherein the over-center linkage comprises:
a first link pivotally coupled to the frame; and
a second flange extending radially from the shaft, the first link pivotally coupled to the second flange at a first pivot point.

10. A mower comprising:
a mower frame having an operator stand-on platform;
a wheel rotatably coupled to the mower frame proximate the operator stand-on platform;
a brake pivotally coupled to the mower frame;
a pedal assembly pivotally coupled to the mower frame, the pedal assembly having a first pedal and a second pedal each radially extending from a shaft, the first pedal extending at least partially in a rearward direction of the mower, the second pedal extending at least partially in a forward direction of the mower;
a push-pull cable having a first end opposite a second end, the first end coupled to the first pedal and the second end coupled to the brake; and
a first link pivotally coupled to mower frame, a second link coupled to the shaft, the first link pivotally coupled to the second link at a pivot point, a biasing member coupled to one of the first link and the second link that urges the pivot point to stay either in a first position where the brake is engaged with the wheel or in a second position where the brake is disengaged from the wheel,
wherein the pivot point is in the first position when the first pedal is depressed,
wherein the pivot point is in the second position when the second pedal is depressed.

11. The mower of claim 10, further comprising:
a second wheel rotatably coupled to the mower frame proximate the operator stand-on platform;
a second brake pivotally coupled to the mower frame; and
a second push-pull cable having a first end opposite a second end, the first end coupled to the pedal assembly and the second end coupled to the second brake.

12. The mower of claim 10, further comprising an operator presence detection system having a plate pivotally coupled to the operator stand-on platform.

13. The mower of claim 12, wherein the plate has an aperture that allows the second pedal to pass through the plate.

14. The mower of claim 10, further comprising a hydrostatic drive system coupled to the mower frame.

15. A stand-on terrain working vehicle comprising:
a frame;
a chain-drive system coupled to the frame, the chain-drive system having a plurality of gears and at least one chain coupled to the plurality of gears;
a wheel coupled to the chain-drive system;
a pawl pivotally coupled to the chain-drive system and configured to move between an engaged position and a disengaged position, the engaged position comprising the pawl engaging one gear of the plurality of gears to prevent rotation thereof, the disengaged position comprising the pawl being retracted from the one gear of the plurality of gears;
a pedal assembly having a shaft rotatably coupled to the frame, a first pedal extending radially from a first end of the shaft at least partially in a rearward direction of the frame, a second pedal extending radially from an intermediate portion of the shaft at least partially in a forward direction of the frame, and a flange extending radially from a second end of the shaft;
an over-center link pivotally coupled to the frame on a first end and pivotally coupled to the flange on a second end; and
an actuator coupled between the pawl and the pedal assembly,
wherein depressing the first pedal causes the shaft to rotate in a first direction and the actuator to cause the pawl to move to the engaged position,
wherein depressing the second pedal causes the shaft to rotate in a second direction and the actuator to cause the pawl to move to the disengaged position.

16. The stand-on terrain working vehicle of claim 15, further comprising a biasing assembly coupled to the chain-drive system and configured to urge the pawl into the disengaged position.

17. The stand-on terrain working vehicle of claim 15, wherein the actuator is coupled to the first pedal.

18. The stand-on terrain working vehicle of claim 15, further comprising:
a second chain-drive system coupled to the frame, the second chain-drive system having a plurality of gears and at least one chain coupled to the plurality of gears;
a second wheel coupled to the second chain-drive system;
a second pawl pivotally coupled to the second chain-drive system and configured to move between an engaged position and a disengaged position; and
a second actuator coupled between the second pawl and a second flange, the second flange extending radially from a second end of the shaft,
wherein rotation of the shaft in the first direction causes the second actuator to move the second pawl to the engaged position,
wherein rotation of the shaft in the second direction causes the second actuator to move the second pawl to the disengaged position.

19. The stand-on terrain working vehicle of claim 15, further comprising:
a third flange extending radially from the shaft; and
a catch coupled to the chain-drive system,
wherein rotation of the shaft in the first direction is stopped by the catch when the second pawl has moved to the engaged position.

20. The stand-on terrain working vehicle of claim 15, wherein the over-center link holds the rotated shaft in one of a first position and a second position, wherein the first position is associated with the pawl being in the engaged position, wherein the second position is associated with the pawl being in the disengaged position.

* * * * *